(12) United States Patent
Dempski

(10) Patent No.: US 7,372,451 B2
(45) Date of Patent: May 13, 2008

(54) INDUSTRIAL AUGMENTED REALITY

(75) Inventor: Kelly L. Dempski, Evanston, IL (US)

(73) Assignee: Accenture Global Services GmbH, Schaffhausen (CH)

( * ) Notice: Subject to any disclaimer, the term of this patent is extended or adjusted under 35 U.S.C. 154(b) by 43 days.

(21) Appl. No.: 10/492,437

(22) PCT Filed: Oct. 18, 2002

(86) PCT No.: PCT/US02/33466

§ 371 (c)(1),
(2), (4) Date: Apr. 13, 2004

(87) PCT Pub. No.: WO03/034397

PCT Pub. Date: Apr. 24, 2003

(65) Prior Publication Data

US 2004/0183751 A1    Sep. 23, 2004

Related U.S. Application Data

(63) Continuation-in-part of application No. 10/046,468, filed on Oct. 19, 2001, now Pat. No. 7,126,558.

(51) Int. Cl.
    *G09G 5/08* (2006.01)
(52) U.S. Cl. .......................... 345/158; 345/8; 715/745
(58) Field of Classification Search ................ 345/7–9, 345/158; 702/150; 715/745
    See application file for complete search history.

(56) References Cited

U.S. PATENT DOCUMENTS

| | | | |
|---|---|---|---|
| 5,696,521 A | 12/1997 | Robinson et al. | |
| 5,731,766 A | 3/1998 | Akamatsu | |
| 5,886,822 A | 3/1999 | Spitzer | |
| 6,046,712 A * | 4/2000 | Beller et al. | 345/8 |
| 6,078,928 A * | 6/2000 | Schnase et al. | 707/104.1 |

(Continued)

FOREIGN PATENT DOCUMENTS

EP    0 499 558 A1    8/1992

(Continued)

OTHER PUBLICATIONS

Dempski, Kelly L., "Context-Sensitive eCommerce," 2000 Conference on Human Factors in Computer Systems (CHI 2000) Extended Abstracts, April 1-6, 2000, The Hague, pp. 1-2.

(Continued)

*Primary Examiner*—Kent Chang
(74) *Attorney, Agent, or Firm*—Brinks, Hofer, Gilson & Lione

(57) ABSTRACT

This invention includes a system and method for displaying a data including detecting visual markers (18) within view of a wearable camera (14) worn by a human worker, determining the environmental status and displaying data associated with at least one of those visual markers and based on the environmental status on a see-through wearable display (12) worn by the operator. Another aspect of the invention provides a system and method for coordinating the movement of human workers comprising detecting one or more visual markers (18) within view of a camera (14) worn by the worker, and determine the location of the worker from the stored location of the visual marker within view of the camera.

35 Claims, 1 Drawing Sheet

U.S. PATENT DOCUMENTS

| | | | |
|---|---|---|---|
| 6,091,546 A | | 7/2000 | Spitzer |
| 6,094,625 A | * | 7/2000 | Ralston .................... 702/150 |
| 6,123,259 A | * | 9/2000 | Ogasawara ................ 235/380 |
| 6,356,437 B1 | | 3/2002 | Mitchell et al. |
| 6,396,691 B1 | | 5/2002 | Pagnozzi |
| 6,522,312 B2 | * | 2/2003 | Ohshima et al. ............... 345/8 |
| 6,760,046 B2 | * | 7/2004 | I'Anson et al. ............. 715/746 |
| 6,803,887 B1 | * | 10/2004 | Lauper et al. .................. 345/9 |
| 6,826,554 B2 | * | 11/2004 | Sone ............................ 707/2 |
| 2002/0046368 A1 | | 4/2002 | Friedrich et al. |
| 2002/0067372 A1 | | 6/2002 | Friedrich et al. |

FOREIGN PATENT DOCUMENTS

WO     WO 01/08414     2/2001

OTHER PUBLICATIONS

The MicroOptical Corporation, Product Information, http://www.microopticalcorp.com/Products/index.html, 1999-2001, pp. 1-2.

* cited by examiner

INDUSTRIAL AUGMENTED REALITY

CROSS REFERENCE OF RELATED APPLICATIONS

This application is related the U.S. national stage of PCT international patent application no. PCT/US02/33466, filed on Oct. 18, 2002, which was published at WO 03/034397, which is a continuation-in-part application of U.S. patent application Ser. No. 10/046,468, filed on Oct. 19, 2001 now U.S. Pat. No. 7,126,558.

BACKGROUND OF THE INVENTION

This invention relates to information processing systems and methods in an industrial environment. More particularly, the invention relates to systems and methods for displaying information for use by human operators in a mobile working environment.

An increasing number of workers today in mobile working environments are assisted by hand-held or wearable computer systems. Rather than using computer kiosks or workstations at locations throughout the work environment, the hand-held or wearable computers allow the worker to move freely about the workspace and retrieve information from computer networks accessible at their fingertips, while they maintain in proximity to the object of the task. Examples of these include retail operations where sales assistants or inventory control clerks carry hand-held computers with bar code scanners that can identify products by scanning the bar code and then displaying information associated with that product. Another example includes car rental return agents who key information into a wearable computer in the parking lot of the rental agency when the car is returned, and then print out a receipt from a wearable printer to be able to give to a customer standing in the parking lot by the rental car.

While these systems are useful, they have limited capabilities. Hand-held computers require the worker to devote one or both hands to the task of inputting information into the computer. Wearable computers generally require the use of at least one hand for inputting data into a computer, as well as requiring the worker to focus his gaze and attention to the hand-held computer rather than on the object or task before him. While these wearable computer solutions are an advance over stationary kiosks and strategically located catalogs, wall charts or instruction manual books accessible to the worker, there is still much room for improvement to free up the hands and attention of the worker, and still get vital information to the worker to thereby increase the workers' productivity and safety.

BRIEF SUMMARY OF THE INVENTION

The present invention addresses the aforementioned needs by providing a system and method for displaying data comprising detecting visual markers within view of a wearable camera worn by a human worker, and making a selection based on the environmental status, displaying selected data associated with at least one of those visual markers on a wearable display worn by the operator.

Another aspect of the invention provides a system and method for coordinating movement of human workers comprising detecting of one or more visual markers within view of a camera worn by the worker, and determining the location of the worker from the known location of the visual marker within view of the camera.

DETAILED DESCRIPTION OF THE INVENTION

Figure 1:
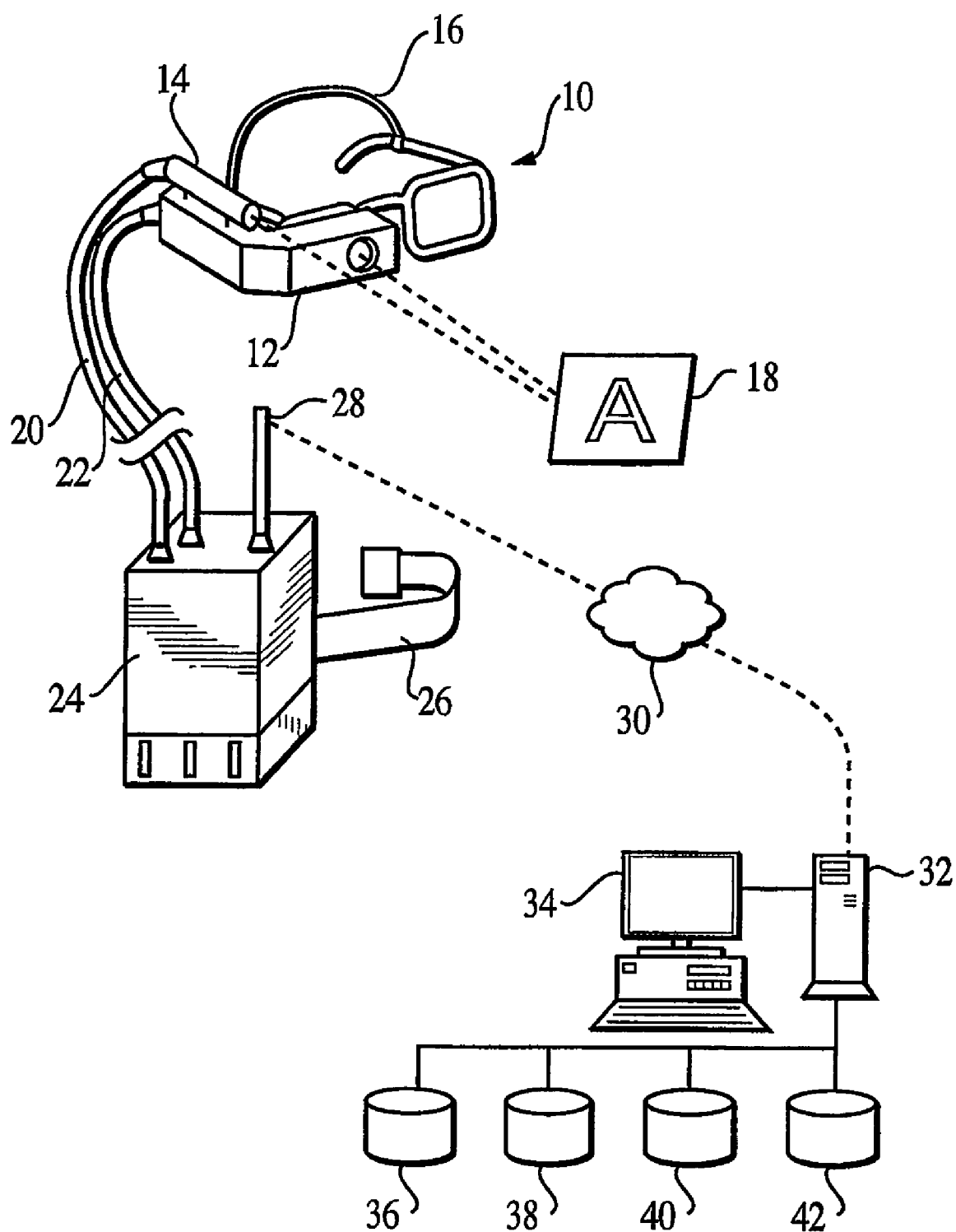
FIG. 1 is a system in accordance with one embodiment of the invention.

Many physical tasks in an industrial work environment can be made more efficient or safer by providing workers with more data about their tasks and their environment. These tasks may include such things as order picking for factory floor activities, or operating and maintaining industrial equipment. This invention makes such tasks more efficient by equipping workers with a small wearable display and a small wearable camera. Preferably both the wearable display and wearable camera are mounted on a pair eyeglasses or goggles. Preferably the camera and display are connected to a small wearable computer. Throughout the work environment, low cost visual markers may be strategically placed to identify locations or objects in proximity to the markers. When the visual marker is within the field of view of the camera, the wearable computer system can "see" and identify the visual marker. Once identified, the wearable display can be used to give the worker instructions or information regarding the identified object or location. The displayed information may be considered "captions" added to augment the reality of the environment viewed by the worker.

FIG. 1 depicts a typical system in accordance with one embodiment of the invention. A pair of eyeglasses 10 includes a wearable see-through display 12 with a wearable camera 14 both of which are attached to the eyeglasses 10. A headband 16 assists with keeping the glasses on the worker's head. The wearable camera 14 is positioned to detect visual markers 18 within the field of view of the worker.

The camera and display are preferably connected through cables 20 and 22 to a wearable computer 24. However, technological developments may permit the connections to be wireless, obviating the need for cables. The wearable computer 24 includes a belt 26 for strapping it to the waist or an appendage (e.g., arm or leg) of a worker. Preferably, the wearable computer 24 includes a wireless transmitter and antenna 28 for wireless connectivity to a computer network 30 in the industrial environment.

Also connected with the network 30 are a network server 32, a processor 34, and several databases. The databases may include, but are not limited to, a visual marker library 36, visual marker location maps 38, production and operation reference manuals 40, and employee preference and profile library 40.

A typical system as described above may include several components that are presently commercially available. The wearable display 12 may be a see-through or see-around micro-optical display, such as eyeglass displays commercially available form Microoptical Corp., Boston, Mass. USA. The small camera 14 may be attached to or integrated with the eyeglass displays. Numerous such cameras are commercially available. The wearable computer 24 may be one such as commercially available from Xybernaut Corp., Fairfax, Va., USA, with a wireless communication transceiver, for example using an 802.11(b) protocol. The wearable computer 24 or the processor 34 preferably includes a visual marker or pattern recognition system such as, but not limited to, the ARToolKit developed by and available from the University of Washington.

The system also includes a computer network 30 wirelessly accessible to the wearable computer. The computer network includes an augmented reality processor 34 in communication with a database located on memory storage devices in communication with a server 32. The databases 36, 38, 40 and 42 store the information or data associated with the objects associated with the visual markers and or mapped locations of the visual markers. The databases may also store data about the work environment, object details, equipment documentation, operation manuals, current status, availability and location of the workers, scheduled tasks for equipment and workers, etc. The server may also be tied into other data sources, such as, for example, process control and automation systems, which may provide status on the operating conditions of the equipment, Enterprise Resource Planning (ERP) systems, which may provide information on schedules, work-in-process, inventory and deliveries of material, and fire alarms systems, which may provide status on locations of fires and other hazards. These systems may provide information to display to workers to provide them more information about their work environment. Also these systems may provide more information to the augmented reality processor as to the environmental status for determining what other information or commands may be appropriate to display to the workers. The server may also be connected through publicly distributed communication networks, such as the internet, to vendor systems to access supplemental information and help desk support for information related to the identified equipment or task.

The invention also provides various methods for applying augmented reality in an industrial work environment. One embodiment of the invention includes a method for displaying data, which includes directing a wearable camera worn by a human operator towards one or more labeled objects within a field of view of the operator, detecting one or more visual markers within a field of view of the camera with at least one of the visual markers associated with and proximate to the labeled object, determining the environmental status, selecting data from a memory storage based on the environmental status with the data being associated with one of the objects associated with one of the visual markers, and then displaying the data on a wearable display worn by the operator. The data may be thought of as a "caption" in the augmented reality environment created by the system.

This embodiment allows the operator or worker to interact with the work environment in a very natural manner. Preferably, the wearable camera is focused within the same field of view as the operator when focusing straight ahead in a work activity. In this way, the system can see the objects that the operator is focusing on. The system is thus programmed to respond to objects that are within the field of view of that camera for at least a predetermined amount of time. If a person stares at an object, that usually means they are trying to obtain more information about the object. Naturally, in response, the system will identify the object of regard, retrieve information about that object from a database, and display that information on the wearable display of the operator. When the operator gazes upon the object for an extended period, the system may be programmed to provide additional information regarding the object. Alternatively, the system may be responsive to voice command of the operator or mechanical inputs from the touch of the operator to provide additional information upon request of the operator.

One of the technical challenges for the system is to acquire a recognition of a target marker consistent with the movement of a worker's gaze. To address this challenge, the data is preferably selected by identifying which of the visual markers is located within a predetermined zone of the field of view of the camera for a predetermined amount of time. The zone is preferably the central 50% of the field of view of the camera. The predetermined amount of time is preferably between about 0.02 seconds and 0.5 seconds. One may consider the appropriate zone and amount of time to replicate a worker's conscious recognition of objects within his field of view. Such a short gaze may result in an acquisition and display of basic information related to the identified marker. The minimum time for a gaze to result in a display of data may be increased by the worker to avoid overload of displays not associated with purposeful gazes. Additional data may then require additional focus and extended gazes on the target marker or requests from the worker.

Preferably, the data is displayed on a see-through display such that the data are superimposed on a real image seen in the field of view of the operator. More preferably, the display is a heads-up see-through display attached to a pair of eyeglasses or goggles worn by the operator. This augments the reality viewed by the worker.

Additional data associated with the object is displayed in response to a request sent by the operator. The request may be an electric signal generated by a voice command from the operator or by a physical touch by the operator, or the request may be a focused gaze upon the object for an extended period of time. Depending on the job activity, the "query" gaze may be between 1 and 2 second of steady gaze for fast-paced activity, such as working in a warehouse, to 5 seconds or longer for slow-paced activity, such as working on a small parts assembly bench, where a worker's gaze does not change much. The timing for such automated requests may be customized for each worker.

To provide for customizable timing for display feedback, a worker's user profile may be stored in the system. Preferably, the user profile is stored on a data server, so that the wearable equipment are generic to the workforce. The profile may include the individual worker's preferred response times associated with a variety of tasks, equipment and time of day for the "query" gaze and other parameters for data response interaction with the system. Multiple user profiles may be stored for each individual, where each profile is associated with different work roles or activities. Such activities may be input by the user or may be automatically selected based on the worker's location or markers in the field of view.

The system can also be programmed to display data responsive to the personal preferences and other personal information maintained in the user profile associated with the operator. For example, a worker's skill set and experience level could be in the user profile. A worker that has special skills and responsibilities as a mechanical maintenance worker would receive information relating to the repair of an object within his view. On the other hand, a person whose job responsibilities involve the operation or manipulation of objects, such as an assembly line operator, will receive information or instructions on their display associated with the operation of an object within their field of view. Likewise, a firefighter staring at the same object may see information about safety precautions, about the volatility of the contents of the object, or additional information about other hazards in the environment to provide a greater overall context for the work environment. Accordingly, each wearable computer would also transmit a unique identifier for the individual using the equipment to be able to retrieve that user's profile and integrate that profile information into the selection of data to be retrieved and displayed. Alternatively, the unique identifier may be call up from the system when a worker dons the wearable computer equipment and logs-into the network.

The system may include an adaptive intelligent agent to monitor a worker's habits, enhance the user profiles and heuristically predict the appropriate captions to display on the worker's goggles. The system may perform this by being preloaded with a detailed user profile for a worker. Alternatively, the system may perform this by developing a learning-based relationship of the worker and training with the worker. During the worker's training period, the system is also trained to respond according to the worker's preferences. The system may build or enhance the different user profiles for different job roles, develop custom speech recognition, adapt to the timing and custom of the worker's visual movements, etc. The preferences, habits and interaction customizations are captured by the agent and stored in the worker's multiple user profile. The worker may provide feedback to the system on the appropriateness of the system's selection and timing of data to be displayed. The agent uses the feedback to modify the user profile to better predict the appropriate data or commands to display and the appropriate timing for recognizing certain focused gazes as query requests for a worker for a given situation. This feedback and adaptation may continue beyond the initial training period. Thereby, the system may become a tool for enhancing the intelligence capability of the worker, while the worker may become an industrial tool with a sophisticated innate intelligence.

Additionally, the method of the invention preferably includes processing the image of the detected visual marker to determine a unique identifier associated with the marker, and transmitting the unique identifier to a processor for selecting the data appropriate for the worker's present task based on contextual clues observed either through the visual markers presently in view or recently viewed, or determined by the environmental status. Preferably, the image processing and pattern recognition is conducted by the wearable computer. This processing may also be done by a workstation or server computer on the network, with the wearable computer merely transmitting the images viewed through the camera.

Visual based markers are preferred for the system because they are extremely low cost. The visual markers can be bar codes, dot matrix codes, or other recognizable patterns, such as letters and numbers. While it is possible to use other type of non-visual markers such as active or passive radio frequency (RF) tags, such tags can be expensive. Also, such RF tags usually only give general proximity information. However, as the cost of RF tags decrease, and technological developments make wireless smart sensors practical, and even locationally directional, these types of sensors may be integrated into the system to replace or enhance the visual markers. At present, visual markers are useful because they may be located on objects by individuals with little or no training. For many applications, this type of tracking and interaction can be more powerful and/or cost effective.

One example of a pattern recognition system for visual markers is the ARToolKit available from Washington University, USA. According to its documentation, the ARToolKit uses computer vision techniques to calculate the real camera viewpoint relative to a real world marker. This process may be broken down into several steps. First, the toolkit converts a live video image of a marker into a binary image based on a lighting threshold value. The toolkit then searches the image for square regions. ARToolKit finds all the squares in the binary image, many of which are not the tracking markers. For each square, the toolkit captures the pattern inside the square and matches it against predetermined pattern templates. If there is a match, then ARToolKit has found one of the AR tracking markers. ARToolKit then uses the known square size and pattern orientation to calculate the position of the real video camera relative to the physical marker. A 3×4 matrix is filled in with the video camera coordinates relative to the physical marker. The toolkit uses the matrix to set the position of the virtual camera coordinates. Assuming the virtual and real camera coordinates are the same, the toolkit may render computer graphics in the display that are drawn precisely to overlay the real marker, or located in a specified area relative to the marker, or within a specified position in the frame of the display. An OpenGL API may be used for setting the virtual camera coordinates and drawing the virtual images.

Depending on the work environment and commonality of objects seen therein, more complex visual pattern recognition systems can be incorporated into this invention. For example, visual quality control inspection systems rely upon pattern recognitions of common elements by comparison with template pattern of such elements. Also, pick and place machines can detect objects out of location by comparison of objects with a database of commonly seen objects. Such pattern recognition systems may be useful in this invention with minor modifications due to the fact that the cameras are not in a fixed position. Likewise, other pattern recognition systems used in roving robotics may be useful.

In addition, visual markers placed on stationary objects such as walls or stationary equipment may be mapped into a database relative to the physical layout of the industrial facility. This allows the computer system to match the viewed marker to a stored physical location so as to determine approximately where the worker is physically located whenever such marker is "seen" by the system. This allows for efficient tracking of workers or operators and efficient routing of tasks.

Moreover, more complex algorithms may be used to calculate the precise location and movement of a worker through space. The location of the worker's camera may be determined based on the perspective of an image of the visual marker within the field of view of the camera, analyzing the movement of the image across the field of view of the camera and calculating the movement of the camera corresponding to the movement of the image. For example, by mapping the precise location of a visual marker in a three-dimensional space, and analyzing the image of the visual marker in a camera's field of view, the distance and angle from which the camera is viewing the marker may be calculated. From that information, the precise location of the camera may be determined, and thereby the location of the worker and the height at which he is standing, sitting or kneeling. By tracking the movement of a marker across the field of view of a camera, the direction and movement of the worker wearing the camera may be determined. By storing the location information, the system may thereby know where a worker was, and where he is going.

This invention, thereby, in a second embodiment, provides for the coordination of movement of workers in a work environment. For example, in a warehouse environment, containers and walls can be marked with visual markers. As workers walk around the warehouse, the system can track where the workers are and where they are going. When a worker is needed in a specific area, the system can identify the nearest worker or one headed in the appropriate direction and provide them with instructions on their wearable display to go to the point of need. When the worker arrives and looks at a specific box or object, the system may identify that object as the correct object of interest, and provide additional instructions for the worker to follow with regard to that object.

Accordingly, the second embodiment of this invention includes a method for coordinating the movement of human workers in an environment comprising directing a wearable camera worn by a human operator towards a one or more labeled objects within a field of view of the operator, and detecting one or more visual markers within a field of view of the camera with at least one of the visual markers associated with and proximate to each of the labeled objects. Further, the method includes processing the image of the visual markers and determining the unique identifier associated with each marker, obtaining the physical location of the markers maintained in a memory storage; and determining the location of the operator from the locations of the markers within the field of view of the camera.

The method may preferably include tracking the movement of the operator by monitoring the movement of the markers across the field of view of the camera, in a manner such as described above. The movement of the worker is preferably coordinated by displaying data on a see-through display such that the data are superimposed on a real image seen in the field of view of the operator with the data including instructions directing the operator to a new location.

In applying this embodiment of this invention, a group of order pickers, for example, may be individually directed to a particular location which optimizes the overall efficiency of the group. The system may dynamically optimize the routing and commands to the workers based on the current locations and their individual progress in completing assigned tasks. The system may track the workers location and obtain contextual cues from visual markers and process automation and control equipment from which the progress of assigned activity may be deduced. The system may compare the stored expectations for worker movement and time requirements with the actual movements to predict the timing for completion of a task. Based on these predictions, the method includes dynamically selecting available workers for scheduling a sequence of tasks to be completed. During this phase of monitoring the workers movement, based on the stored task assigned to the worker, the system may determine which visual markers within view of the worker would require a responsive caption displayed to the worker, and which visual markers may be used merely for tracking location and progress.

The various embodiments of this invention are not limited to a factory floor environment, but can be applied to a wide variety of industrial work places. Similar scenarios can be described in situations such as hospitals, factories, oil fields, chemical plants or anywhere that there are physical tasks that require detailed knowledge to make the task safer and/or more efficient.

In addition, this invention has applicability beyond industrial environments. For example a museum or historical building may be equipped with a system in accordance with this invention and the tourists provided with wearable computers, cameras, see-through displays and head phones wirelessly linked to the network. The tourists may be taken on a personalized, interactive, multimedia tour of the museum or historical place. The tourist may obtain a customized richer augmented reality experience. Details about objects within view of the tourist may be provided on the displays based on the visual markers within view. The tourist may control the level of detail desired by continuing to gaze or moving to the next exhibited item. The tourist may be provided commands to move to different locations based on a pre-selected tour or a dynamically selected tour based on the tourist's interest in certain items on display. The system may coordinate the movement of all tourists in the museum to manage the traffic and congestion by monitoring the location of all tourists and providing individual commands to move to a new location. Naturally, the system may be programmed to allow tourists greater lingering time at off-peak hours, while hurrying tourists along at peak traffic times by using behavioral modifiers, such as limiting the level of detailed information displayed.

While this invention has been shown and described in connection with the preferred embodiments, it is apparent that certain changes and modifications, in addition to those mentioned above may be made from the basic features of this invention. In addition, there are many different types of computer software and hardware that may be utilized in practicing the invention, and the invention is not limited to the examples described above. Accordingly, it is the intention of the applicants to protect all variations and modifications within the valid scope of the present invention. It is intended that the invention be defined by the following claims, including all equivalents.

What is claimed is:

1. A method for displaying data associated with one or more objects within a field of view of a human operator in an environment, the method comprising:
   receiving an image from a wearable camera worn by a first human operator, the image including a representation of the field of view of the first human operator;
   automatically detecting one or more visual markers within the image representation of the field of view of the first human operator, at least one of said visual markers associated with and proximate to an object within the field of view of the first human operator;
   receiving information from one or more environmental monitoring systems, the information related to a status of at least a second human operator in the environment;
   determining a current environmental status according to the information received from the environmental monitoring systems;
   selecting data from a memory storage based on the environmental status and the one or more of said visual markers; and
   displaying the data on a wearable display worn by said first human operator.

2. The method of claim 1, wherein said selecting data includes identifying which of said visual markers is located within a predetermined zone of view of said camera for a predetermined amount of time.

3. The method of claim 1, further comprising displaying additional data associated with said object in response to a request sent by the first human operator.

4. The method of claim 3, wherein the request is determined by maintaining the object of interest within the predetermined zone of view for a predetermined period of time.

5. The method of claim 4, wherein the predetermined period of time is determined by accessing a user profile associated with the first human operator, identifying the period of time associated with the object of interest.

6. The method of claim 1, further comprising processing the image the detected visual marker to determine a unique identifier associated with the marker, and transmitting the unique identifier to a processor for selecting said data.

7. The method of claim 1, wherein the selecting of data further comprises accessing a user profile associated with the first human operator, and identifying the data based on preferences in the user profile.

8. The method of claim 7, further comprising tracking the location of the first human operator by tracking detected markers, and further identifying the data based on the location of the first human operator.

9. The method of claim 1, wherein the selected data are instructional commands directing the activity of the first human operator.

10. The method of claim 1, wherein the determining the environmental status further comprises assessing the needs of the environment based on at least one of unfulfilled tasks, process control and automation data, and enterprise resource planning data.

11. The method of claim 10, wherein the selecting data further comprises identifying the first human operator; analyzing a user profile associated with the first human operator; and selecting data based on relevant attributes in the user profile.

12. The method of claim 1 where the monitoring systems providing information over the network are a process control system, automation system, fire alarm system, hazard detection system, environmental control system or combinations thereof.

13. The method of claim 1 where the monitoring system comprises a control system configured to provide information related to the status of operating conditions for equipment.

14. The method of claim 1, wherein the status of the at least second human operator comprises information related to a location for the at least second human operator in the environment.

15. The method of claim 1, wherein the status of the at least second human operator comprises information related to availability for the at least second human operator in the environment.

16. The method of claim 1, wherein:
determining a current environmental status according to the information received from the environmental monitoring systems comprises
identifying the at least second human operator in the environment;
comparing a status of the first operator with the status of the at least second human operator; and,
identifying the first human operator based on the comparison between the status of the first human operator with the status of the at least second human operator; and wherein,
selecting data from a memory storage based on the environmental status and the one or more of said visual markers comprises selecting instructions on interacting with the object.

17. The method of claim 1, further comprising positioning the one or more visual markers proximate to the object within the environment of the first human operator.

18. The method of claim 17, wherein selecting data from the memory storage is further based on the positioning of the visual marker proximate to the object.

19. A method for coordinating the movement of human workers in an environment having one or more objects labeled with a visual marker therein, the method comprising:

receiving an image from a wearable camera worn by a first human operator towards a field of view of the first human operator;
automatically detecting one or more visual markers within the image, at least one of said visual markers associated with and proximate to each of the objects;
receiving information from one or more environmental monitoring systems, the information related to a status of at least a second human operator in the environment;
determining a current environmental status according to the information received from the environmental monitoring systems;
processing the image of the visual marker and determining a unique identifier associated with the marker based on the current environmental status and the processed image of the visual marker;
based on determining the unique identifier, obtaining the physical location of the marker maintained in a database on a memory storage; and,
determining the location of the first human operator based on the location of the one or more markers within the field of view of the first human operator.

20. The method of claim 19, further comprising tracking the movement of the first human operator by determining the location of the camera based on the perspective of an image of the one or more visual markers within the field of view of the camera, analyzing the movement of the image across the field of view of the camera and determining the movement of the camera corresponding to the movement of the image.

21. The method of claim 19, further comprising tracking the movement of the first human operator by monitoring the series of markers passing within the field of view of the camera.

22. The method of claim 19, further comprising displaying data on a see-through display such that the data are superimposed on a real image seen in the field of view of the first human operator, wherein said data includes information directing the first human operator to a new location.

23. The method of claim 22, wherein said data is based on the optimization of the movement of a plurality of human operators in the environment.

24. The method of claim 19, wherein the optimization of the movement of the first and at least second human operators is based on a location for each of the operators in the environment.

25. The method of claim 19, wherein the optimization of the movement of the first and at least second human operators is based on availability for each of the operators in the environment.

26. The method of claim 19, further comprising positioning the one or more visual markers proximate to the object within the environment of the first human operator.

27. A system for displaying data associated with one or more objects within a field of view of a human operator in an environment comprising:
a wearable camera worn by a first human operator, said camera capable of viewing at least a substantial portion of a field of view of the first human operator, and capable of viewing visual markers proximate to objects within the field of view of the first human operator
a wearable computer system having logic capable of automatically detecting one or more visual markers within the field of view of the camera, determining an identifier associated with the marker, and wirelessly transmitting the identifier to a computer network and wirelessly receiving data associated with the identifier from the computer network;

a memory storage in communication with the network for storing the data associated with the markers, wherein the data includes documentation and operating commands for the movement of the first human operator;

logic on computer readable medium in communication with the network configured to receive information from one or more environmental monitoring systems providing information over the network, the information related to a status of a second human operator in the environment;

logic on computer readable medium in communication with the network capable of determining a current environmental status according to the information received from the environmental monitoring systems and selecting the appropriate data for transmission to the wearable computer system, the data being selected according to the identifier wirelessly received from the wearable computer system and the determined environmental status; and a wearable display for displaying the selected data.

28. The system of claim 27 wherein the wearable display is a see-through display permitting simultaneous viewing of information on the display and of objects within the field of view of the first human operator.

29. The system of claim 27 further comprising a second memory storage in communication with the network for storing user profiles and preferences associated with the first human operator wearing the camera and display.

30. The system of claim 29 further comprising logic stored on computer readable memory capable of selecting data from a plurality of data associated with an object based on the stored user profiles and preferences.

31. The system of claim 30 further comprising logic stored on computer readable memory capable of modifying the user profiles and preferences based on the first human operator interaction with the system.

32. The system of claim 27 further comprising a third memory storage in communication with the network for storing locations of visual markers and logic stored on computer readable memory capable of storing in memory the location at specific times of human operators wearing the camera based on comparing detected markers with the stored location of the markers.

33. The system of claim 27 where at least one of the monitoring systems providing information over the network is a process control system, automation system, fire alarm system, hazard detection system, environmental control system or combinations thereof.

34. The system of claim 27, wherein the status of at least second human operator comprises information related to a location for each of the human operators in the environment.

35. The system of claim 27, wherein the status of at least second human operator comprises information related to availability for each of the human operators in the environment.

* * * * *